(12) United States Patent
Krizenecky et al.

(10) Patent No.: US 11,038,675 B2
(45) Date of Patent: Jun. 15, 2021

(54) ELECTRONIC VOTING USING SECURE ELECTRONIC IDENTITY DEVICE

(71) Applicant: GEMALTO SA, Meudon (FR)

(72) Inventors: Milan J. Krizenecky, Meudon (FR); Michael Webster, Meudon (FR); Michal Botka, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 151 days.

(21) Appl. No.: 15/761,102

(22) PCT Filed: Sep. 19, 2016

(86) PCT No.: PCT/EP2016/072112
§ 371 (c)(1),
(2) Date: Mar. 18, 2018

(87) PCT Pub. No.: WO2017/046411
PCT Pub. Date: Mar. 23, 2017

(65) Prior Publication Data
US 2018/0270055 A1 Sep. 20, 2018

(30) Foreign Application Priority Data

Sep. 18, 2015 (EP) ..................................... 15306461

(51) Int. Cl.
*H04L 9/08* (2006.01)
*H04L 9/32* (2006.01)

(52) U.S. Cl.
CPC .............. *H04L 9/0844* (2013.01); *H04L 9/32* (2013.01); *H04L 2209/42* (2013.01); *H04L 2209/463* (2013.01)

(58) Field of Classification Search
CPC ... H04L 9/0844; H04L 9/32; H04L 2209/463; H04L 2209/42

(Continued)

(56) References Cited

U.S. PATENT DOCUMENTS 6,795,919 B1* 9/2004 Gibbs ................ G06Q 20/3821
705/76
8,316,237 B1* 11/2012 Felsher ................ H04L 9/0825
713/171

(Continued)

OTHER PUBLICATIONS

Gisela Meister et al: "eVoting with the European Citizen Card", (Jul. 21, 2008), XP055250567, Retrieved from the Internet: URL:https://www.ecsec.de/fileadmin/Ecsec-files/pub/ECC-voting.pdf [retrieved on Feb. 16, 2016] cited in the application, Sections 3.2 and 3.3.

(Continued)

*Primary Examiner* — Badrinarayanan

(74) *Attorney, Agent, or Firm* — The Jansson Firm; Pehr B. Jansson

(57) ABSTRACT

Electronic voting including a registration authority server, an election authority server, and a voter-host computer connected to an electronic identity card associated with a voter casting a vote. The registration authority server computer and the secure electronic identity card establish a first cross-domain unlinkable pseudonym for the secure electronic identification token, the first cross-domain unlinkable pseudonym being unique to the electronic identity card and the registration authority. The registration authority writes a vote-eligibility attribute on the electronic identity card. The election authority server computer retrieves a second cross-domain unlinkable pseudonym and the vote-eligibility attribute from the electronic identity card, the second cross-domain unlinkable pseudonym being associated with the election authority, and writes an attribute on the electronic identity card indicative of receipt of a vote cast by the voter.

11 Claims, 11 Drawing Sheets

(58) Field of Classification Search
USPC .......................................................... 713/150
See application file for complete search history.

(56) References Cited

U.S. PATENT DOCUMENTS

| | | | | |
|---|---|---|---|---|
| 2005/0044413 | A1* | 2/2005 | Elms | G06Q 20/3821 726/4 |
| 2006/0041514 | A1* | 2/2006 | Bogasky | G07C 13/00 705/64 |
| 2007/0051804 | A1* | 3/2007 | Anderson | G07C 13/00 235/386 |
| 2007/0051805 | A1* | 3/2007 | Iyer | G07C 13/00 235/386 |
| 2008/0059791 | A1* | 3/2008 | Lee | G06Q 20/3821 713/155 |
| 2008/0105742 | A1* | 5/2008 | Kim | H04W 12/033 235/386 |
| 2010/0121765 | A1* | 5/2010 | Ahrens | G07C 13/00 705/50 |
| 2010/0161999 | A1* | 6/2010 | Poovendran | H04L 9/3273 713/189 |
| 2010/0325441 | A1* | 12/2010 | Laurie | H04L 63/0815 713/185 |
| 2011/0202767 | A1* | 8/2011 | Hui | H04L 9/321 713/168 |
| 2012/0167189 | A1* | 6/2012 | Aichroth | H04L 9/006 726/7 |
| 2012/0239932 | A1* | 9/2012 | Puiggali Allepuz | H04L 9/008 713/170 |
| 2013/0091581 | A1* | 4/2013 | Pirani | G06F 21/31 726/26 |
| 2015/0012339 | A1* | 1/2015 | Onischuk | G07C 13/00 705/12 |

OTHER PUBLICATIONS

"Advanced Security Mechanisms for Machine Readable Travel Documents and eIDAS Token—", (Feb. 3, 2015), XP055239778, Retrieved from the Internet: URL:https://www.bsi.bund.de/SharedDocs/Downloads/EN/BSI/Publications/TechGuidelines/TR03110/BSI_TR-03110_Part-2-V2_2.pdf?blob=publicationfile&v=1 [retrieved on Jan. 8, 2016] cited in the application the whole document.

Matt Smart et al: "True Trustworthy Elections: Remote Electronic Voting Using Trusted Computing", (Sep. 2, 2011), Autonomic and Trusted Computing, Springer Berlin Heidelberg, Berlin, Heidelberg, pp. 187-202, XP019162409, ISBN: 978-3-642-23495-8 cited in the application, the whole document.

Jens Bender et al: "Domain-Specific Pseudonymous Signatures for the German Identity Card", (Sep. 19, 2012), Information Security, Springer Berlin Heidelberg, Berlin, Heidelberg, pp. 104-119, XP047016711, ISBN: 978-3-642-33382-8, cited in the application, the whole document.

PCT/EP2016/072112, International Search Report, dated Oct. 31, 2016, European Patent Office, P.B. 5818 Patentlaan 2 NL—2280 HV Rijswijk.

PCT/EP2016/072112, Written Opinion of the International Searching Authority, dated Oct. 31, 2016, European Patent Office, D-80298 Munich.

* cited by examiner

ELECTRONIC VOTING USING SECURE ELECTRONIC IDENTITY DEVICE

BACKGROUND OF THE INVENTION

The present invention relates generally to electronic voting, and more particularly to online voting using electronic identity devices.

Many activities that humanity has carried out for centuries, if not millennia, can in modern times be performed online over the Internet. Online banking, commerce, auctions, etc. are more-and-more prevalent. In many cases the power of the Internet is both a convenience and a risk.

Voting, whether in public elections or in the context of organizations and corporations, is one example of such a transformation from paper to electronics. Elections have traditionally been carried out using paper ballots and mechanical voting machines. However, the Internet has brought with it an interest in providing for online elections in which voters may cast their votes using web-browsers thereby allowing voters the convenience of voting from their home and offices. Previous attempts have addressed maintaining that convenience while also addressing security, transparency, and fairness concerns.

Elections have always been fraught with dangers of unfairness, manipulation, malfeasance, coercion, incorrect tallying of results, and lack of transparency. Much effort is expended in traditional elections to demonstrate that such problems are avoided. Naturally, electronic elections require attention to avoid all such flaws as well as other problems inherent to electronic elections, for example, allowing a voter to cast a vote from the voter's web-browser while away from a polling station makes the voter much more vulnerable to coercion.

Thus, it is crucial to the acceptance of electronic voting to address the following concerns. Overall the election should provide for:
  Accessibility
  Readily verifiable and auditable
  Properly capture the intent of the electorate
  Provide transparency into the process
  Coercion resistant—resistance to third parties forcing a voter to vote in a particular way
  Integrity—assurance that a vote is not changed by anyone other than the voter.
  From voters' perspective:
  A cast vote should be anonymous and untraceable
  Voters should be able to prove that they have voted
  Voters should be able to verify that their votes have been accepted and counted.
  From the perspective of the election authorities and government holding an election
  Ensure that only persons eligible to vote are allowed to vote
  Ensure that each voter only votes once in an election
  Ensure that only legitimate votes are accepted
  Provide transparency into the election.

A goal for electronic voting is to provide the possibility for voting to occur in places other than at designated voting locations, e.g., at the home or office of a voter or any other location. Smart and Ritter describe a mechanism for using trusted platform modules (TPM) and direct anonymous attestation to perform remote electronic elections. Matt Smart, Eike Ritter: True Trustworthy Elections: Remote Electronic Voting Using Trusted Computing. ATC 2011: 187-202. A trusted platform module is an international standard for secure computing that provides for inclusion of a highly secure module, the TPM, which has dedicated cryptographic processing capabilities thereby allowing for integration of cryptographic keys into devices. ISO/IEC 11889-1:2009 Information technology—Trusted Platform Module—Part 1: Overview, http://www.iso.org/isocatalogue_detail.htm?csnumber=50970, accessed on, Jul. 15, 2015. The TPM provides a technology in which it is possible to ascertain that a given computer is secure. Direct anonymous attestation is a mechanism allows a verifier to be convinced that a voter is using a valid TPM in a computer and that TPM may then be used to verify that that computer is running the correct software. Through DAA, a verifier and a TPM cooperate to anonymously obtain this verification. In Smart and Ritter's system, a voter registers in person with an election administrator and receives paper validity cards each bearing a number $\delta_j$ and one of which being selected by the voter to be linked by the voter to the voter's intended vote bearing a value $\delta_A$. Only the voter is aware of which of the validity card is to be linked to a valid vote using the value $\delta_A$. When the voter votes, she uses the links her vote to a value $\delta_j$ and the tallier can verify the vote by comparing the used value $\delta_j$ against the value $\delta_A$. When voting, the voter uses her TPM and DAA to provide a pseudonym generated by the TPM.

A mechanism that has been explored by several authors and voting jurisdictions is the use of electronic identity cards as a core element to ensure the security of voting in electronic elections and to address some of the concerns listed above. Electronic identity cards, for example, the eIDAS token ([TR 03110] German Federal Office of Information Security, BSI TR-03110 eIDAS Token Specification, https://www.bsi.bund.deEN/Publications/TechnicalGuidelines/TR03110/BSITR03110-eIDAS_Token_Specification.html, accessed on Jul. 10, 2015), are identity cards usually having a photograph identifying the holder of the card as well as biographic information such as name and person number. Furthermore, electronic identity cards contain an integrated circuit chip for securely storing private information, for example, biographic information identifying the holder of the card. Additionally, electronic identity cards contain cryptographic keys and mechanisms allowing for a holder to authenticate to the card, to provide cryptographic electronic signatures, to provide for restricted identification.

The Republic of Estonia has been on the forefront of performing elections in which the electorate may vote, using an electronic identity card, using a web-browser connected to the World Wide Web. Estonian National Election Committee (Vabariigi Valimiskomisjoni), Internet Voting in Estonia, http://www.vvk.ee/voting-methods-in-estonia/engindex/ accessed on Jul. 10, 2015. In the Estonian e-voting scheme a voter downloads a voting application to his or her computer. The voting application encrypts the vote of a voter using the public key of the election system. Further, the voting application cryptographically signs the encrypted vote using the private key of the voter, wherein the private key is stored on the electronic identity card of the voter. The signed and encrypted vote is then transmitted to a vote forwarding server which authenticates the voter. The vote-forwarding server also sends a confirmation to the voter. A separate server (vote storage server) stores votes and after the close of the election removes the digital signature from the encrypted vote, thereby assuring the anonymity of the voter, and forwards the encrypted vote to a vote counting application which uses the private key of the election system to retrieve the vote cast by the voter and to tabulate the votes. The Estonian e-voting scheme provides for coercion resistance by allowing voters to change their votes up to a specified deadline. This allows a coerced voter to change his or her vote once the influence causing the coercion is removed. Estonian National Committee, E-Voting System General Overview, Tallin 2005-2010, http://www.vvk.ee/public/dok/General_Description_E-Voting_2010.pdf accessed on Jul. 13, 2015.

Giesla Meister et al. propose an electronic voting scheme that uses the European Citizen Card (ECC) (COMITE' EUROPE' EN DE NORMALISATION (CEN). Identification card systems—European Citizen Card—Part 1-4. (Draft of) Technical Specification, 2008) to implement an electronic voting scheme. In the system of Meister et al., a unique credential $c_j$ is generated by the ECC using the Restricted Identification mechanism defined in BSI-TR-03110(V2.0). The voter registration authority reads user specific data from the ECC, such as the name of the user and document number. Based on this identification, the registration authority can ensure that a voter is only registered one time. When the registration authority has verified the eligibility of the voter to register, the registration authority requests the ECC to create an election specific identifier $c_j$ from a private identifier stored in the ECC (and which is not accessible outside of the ECC) and the public key of the election authorities. The election specific credential cannot be linked to the individual voter. Gisela Meister et al., *eVoting with the European Citizen Card* http://www.ecsec.de/fileadmin/Ecsec-files/pub//ECC-voting.pdf, accessed on Jul. 15, 2015.

In the Meister system, the registration authority stores an election-specific template on the ECC which is an attempt to guard against randomization and forced abstention attacks. Coercion resistance is provided for using a mechanism of providing a voter with two PIN codes, one that is used to cast a valid vote and one that is used to cast a fake vote. As long as the voter knows which is which and a coercer does not, the voter can use the fake vote PIN to cast an invalid vote and yet be able to cast a valid vote when the coercer cannot influence the voter.

During the election, the template is verified against an actual ballot. Thus, during the casting of votes, the election uses information stored on the electronic identity card during the registration process. That mechanism links the registration to specific election mechanisms. It is desirable to provide a mechanism by which the registration mechanism is independent of the election mechanism.

From the foregoing it will be apparent that there is still a need for an improved technology for remote electronic voting to provide secure, coercion-resistant elections in which voters may demonstrate that they have voted while taking advantage of the capabilities of electronic identity cards generally available to voters without requiring election-specific data to be stored on the electronic identity cards used to secure the voting process, without requiring in-person registration and without requiring a user to memorize any secret information associated solely with an election.

DETAILED DESCRIPTION OF THE INVENTION

Figure 1:
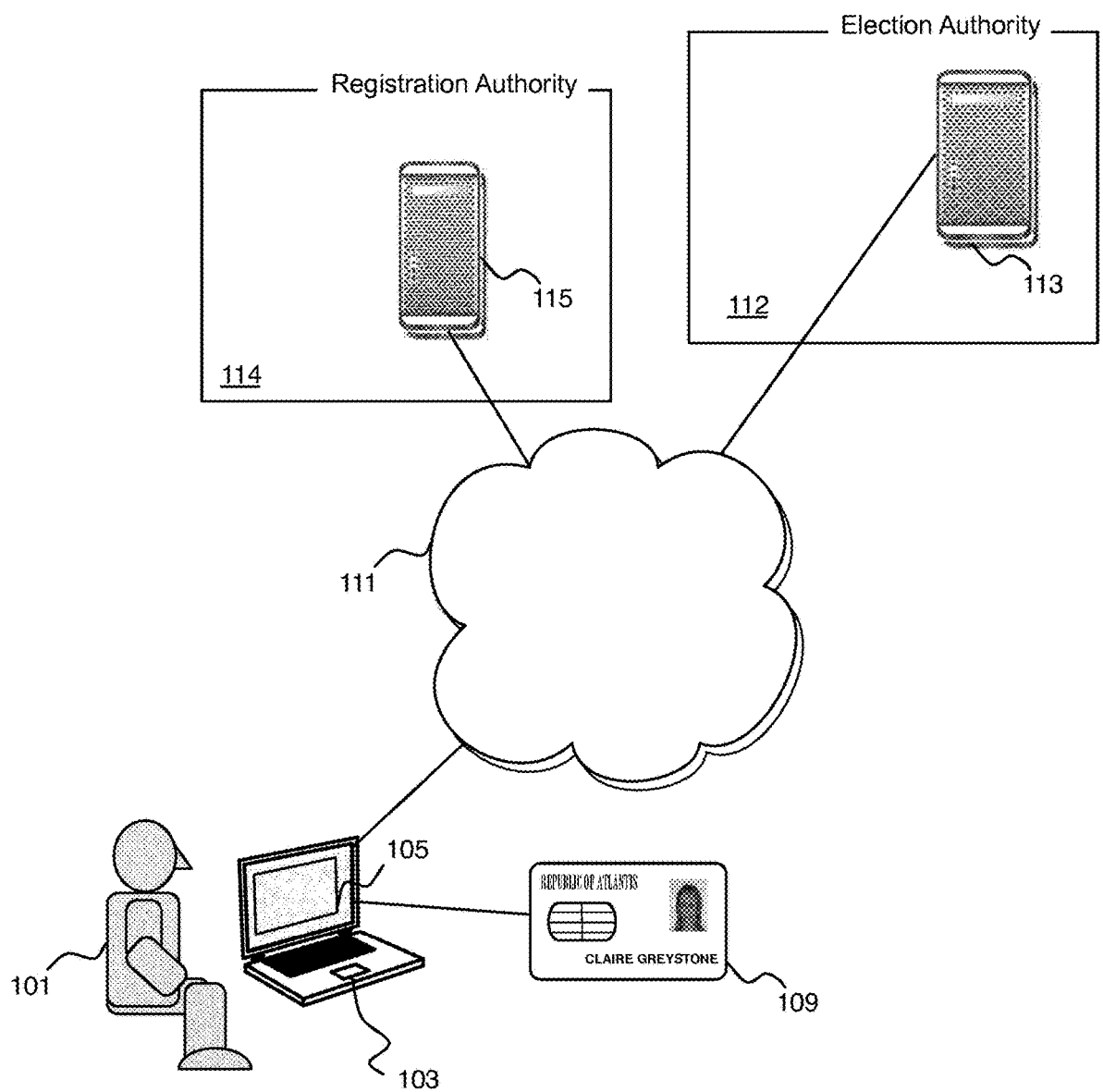
FIG. 1 is a schematic illustration of a network connecting a citizen-host computer with a portable security device, e.g., an electronic identity card, connected thereto to one or more online servers described in greater detail herein below.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is described which providing remote electronic voting that provides for secure registration for elections in an election scheme agnostic fashion, that requires no election specific materials be provided to the voter during the registration phase, and which does not require the voter to physically visit a registration authority. The election scheme makes use of pseudonyms that are unlinkable across domains, e.g., by providing for one cross-domain unlinkable pseudonym for registration with a registration authority and another cross-domain unlinkable pseudonym for use with the election itself.

FIG. 1 is a schematic illustration of a network 111 connecting a citizen-host computer 103 with a portable security device 109, e.g., an electronic identity card, connected thereto to one or more online servers described in greater detail herein below. The citizen-host computer 103 is operated by a user 101 who operates a web browser window 105 of a web browser. In the particular context of the present technology the user 101 is a voter in an online election, for example, the user 101 may be a citizen who wishes to cast a vote in a public election. In the example scenario illustrated in FIG. 1, the portable security device 109 may be an electronic citizen identity card such as eIDAS token (Electronic Identification, Authentication and Trust Services) described in [TR 03110, supra]. In alternative implementations the portable security device 109 may be any other electronic identity card that provides privacy while operating to identify the holder of the device.

As is discussed in greater detail herein below, the user 101, hereinafter referred to as the voter 101, operates the web browser (via the browser window 105) to connect to a server 113 administered by an election authority 112 to cast a vote in an election. The election authority 112 operates one or more servers 113, hereinafter, election authority server computer(s) 113. Having confirmed that a voter 101 is allowed to vote in an election, the election authority server computer's role is to record the voter's vote.

The voter 101 also operates the web browser to connect to one or more servers 115 operated by a registration authority 114. The registration authority's role in the administration of elections is to verify that a voter is eligible to vote in the election.

Figure 2:
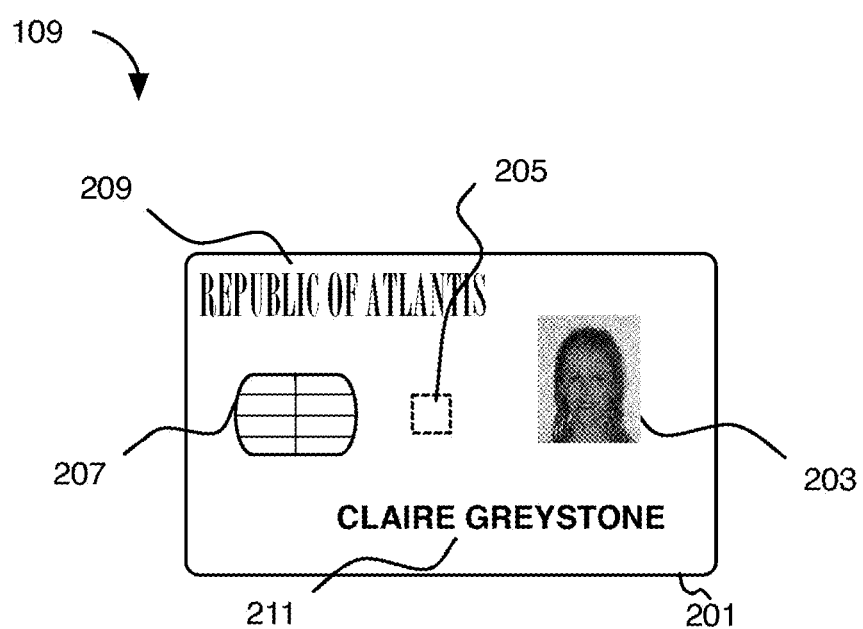
FIG. 2 is a top-view of an electronic identity card, for example, implemented as a smartcard.

FIG. 2 is a top-view of an electronic identity card 109, for example, implemented as a smartcard. The electronic identity card 109 typically encompasses a plastic substrate 20. The integrated circuit card further includes an embedded integrated circuit card chip 205, which is typically connected to a contact pad 207. In alternative embodiments, the integrated circuit card chip may connect to external readers using connectors such as Universal Serial Bus (USB) connectors or wirelessly using techniques such as near-field communication (NFC) or radio-frequency identification (RFID) protocols.

The electronic identity card 109 typically includes some physical identifying information, e.g., a logo 209 identifying the issuing country of origin, a photograph 203 and a name 211 of the person who is citizen to which the electronic identity card has been issued, i.e., herein the voter 101. While these are mere visual manifestations of the personal nature of the electronic identity card 109, they are indicative of the personal nature of each individual card. The issuing authority also personalizes the specific electronic identity card 109 assigned to a citizen by storing information pertinent to that citizen and with applications that the citizen can execute using the card 109 in non-volatile memory of the card. For example, cryptographic keys associated with the citizen may be stored on the card 109 during card personalization. These cryptographic keys include:

$PK_{cvca}$, which is a root key also known as the trust point corresponding to a country verifying certification authority. An electronic identity card 109 can use the $PK_{cvca}$ to verify the certificate chain provided by a registration authority or election authority during terminal authentication.

$SK_{PICC}/PK_{PICC}$: Chip Authentication keys private and public keys (Technical Guideline TR-03110-1 Advanced Security Mechanisms for Machine Readable Travel Documents and eIDAS Token—Part 1—eMRTDs with BAC/PACEv2 and EACv1 (https://www.bsi.bund.de/SharedDocs/Downloads/EN/BSI/Publications/TechGuidelines/TR03110/BSI_TR-03110_Part-1_V2-2.pdf?_blob=publicationFile, accessed on, Jul. 23, 2015)

$PK_{ID}/SK_{ID}$: Restricted Identification private and public keys, respectively. These keys are used by the Restricted Identification process to create an anonymous pseudonym, e.g., a Restricted Identification.

Alternatively, $PK_{ICC,1}/SK_{ICC,1}$, $PK_{ICC,2}/SK_{ICC,2}$: Pseudonymous Signature keys The electronic identity card 109 may further store biographic information such as name, date-of-birth, gender, address, nationality, municipality etc. of the holder of the card.

Figure 3:
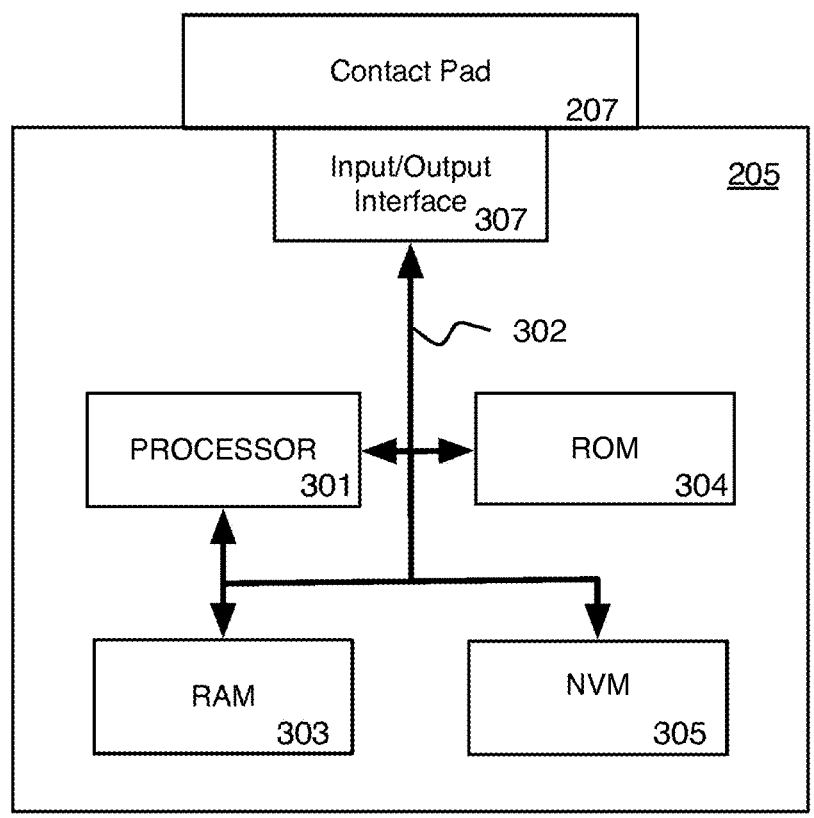
FIG. 3 is a schematic illustration of the hardware architecture of an electronic identity card, specifically, a chip-module of an electronic identity circuit card.

FIG. 3 is a schematic illustration of the hardware architecture of an electronic identity card 109, specifically, the chip-module 205 of an electronic identity circuit card 109. The chip-module 205 may include a processor 301 connected via a bus 302 to a random access memory (RAM) 303, a read-only memory (ROM) 304, and a non-volatile memory (NVM) 305. The chip-module 205 further includes an input/output interface 307 for connecting the processor 301, again typically via the bus 302, to the connector pads 207 by which the electronic identity card 109 may be connected to a card reader. The electronic identity card 109 may alternatively connect to the outside world wirelessly and would in such embodiments typically include an antenna rather than the connector pads 207. It should be noted that the chip-module 205 may, alternatively, be located in a SIM card (also known as a Universal Integrated Circuit Card (UICC)), embedded Secure Element (GlobalPlatform, GlobalPlatform made simple guide: Secure Element, https://www.globalplatform.org/mediauideSE.asp, accessed on, Jul. 27, 2015), a Micro SD card, or similar secure device.

The ROM 304 may or may not be present. Herein is described a technology in which much of the functionality that has hitherto been placed in ROM is now located in the NVM 305. However, that does not preclude that the electronic identity card 109 has a ROM for some other purpose.

Figure 4:
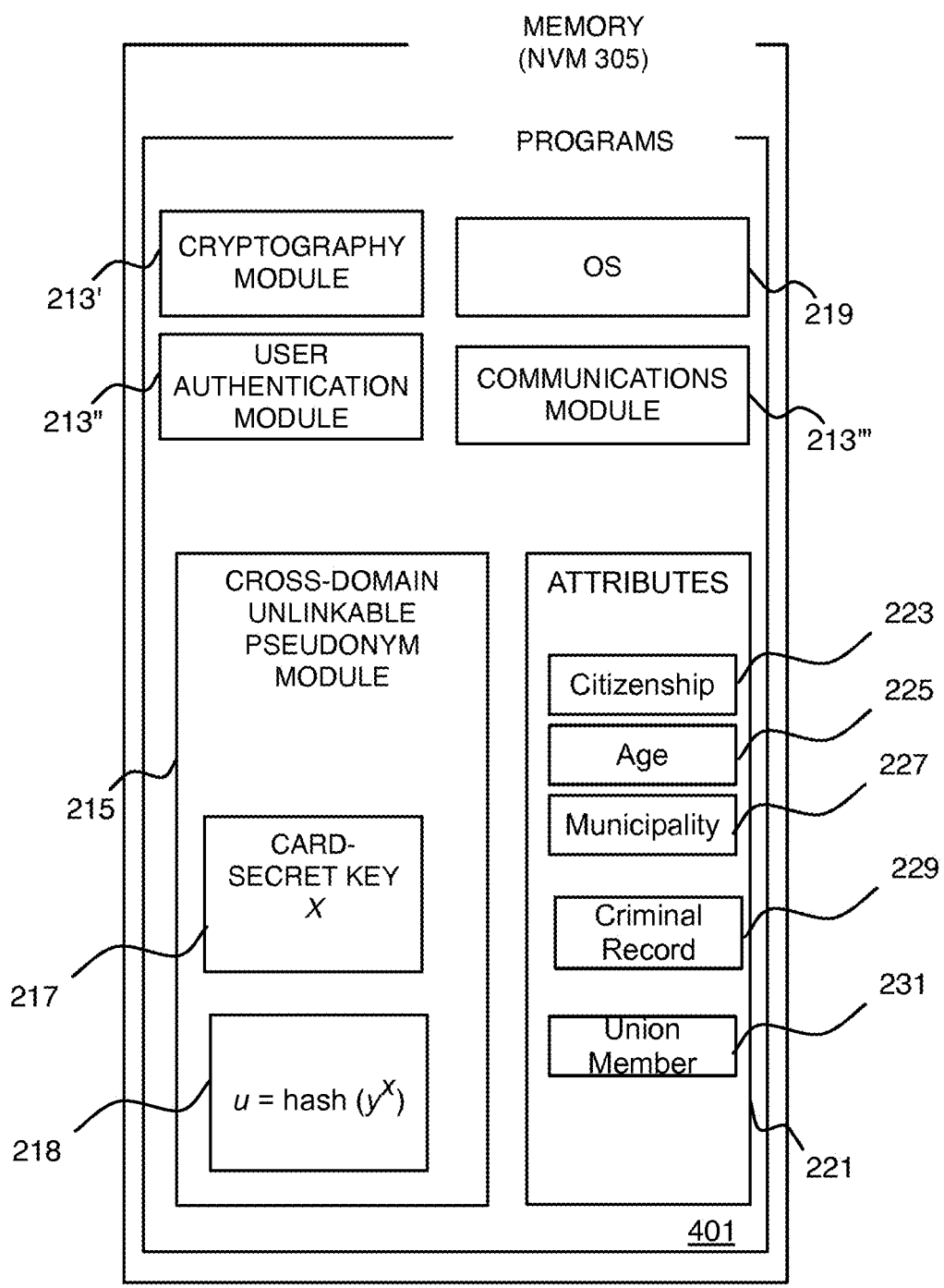
FIG. 4 is a schematic illustration of computer programs loaded onto a electronic identity card as well as data such as cryptographic keys supporting cross-domain unlinkable pseudonym applications used as described herein below.

FIG. 4 is a schematic illustration of computer programs 401 loaded onto a electronic identity card 109 as well as data such as cryptographic keys supporting cross-domain unlinkable pseudonym applications used as described herein below. The NVM 305 may include computer programs 401 as is illustrated in FIG. 4. While it is here depicted that the computer programs 401 are all co-located in the NVM 305, in actual practice there is no such restriction as programs may be spread out over multiple memories and even temporarily installed in RAM 303. The programs 401 include operating system programs as well as application programs loaded on to the electronic identity card 109. While FIG. 4 illustrates an example of the contents of an example of an electronic identity card 109, other embodiments of electronic identity card 109 may include other contents and many not necessarily include all the items illustrated in FIG. 4.

The electronic identity card 109 programs 401 may include the operating system OS 219 as well as other system programs 213, e.g., cryptography module 213', authentication module 213", and communications module 231'". The system programs 213 may include functionality of the electronic identity card 109 required to perform, for example, cryptography and communications aspects of the methods described herein. The authentication module 213" may provide for one or more of General Authentication Procedure (GAP) processes such as Password Authenticated Connection Establishment (PACE), Terminal Authentication (TA) and Chip Authentication (CA). GAP is described in greater detail below in conjunction with FIG. 5 and in [TR-03110], supra.

The electronic identity card 109 programs 401 may further include a cross-domain unlinkable pseudonym module 215 for causing the electronic identity card 109 to perform card-side operations of a cross-domain unlinkable pseudonym operation, e.g., Restricted Identification process. Restricted Identification is, for example, defined as a protocol for the German identity card (a.k.a., the German ID card (neuer Personalausweis, nPA)) and the next generation identity card (the eIDAS card) defined in [TR-03110], supra. This protocol provides for sector-specific pseudonyms that allows card-holders identify to service providers of a given sector. A public key y is assigned to each sector. Conversely, each electronic identity card 109 is assigned a random value x. Given the sector public key y and the individual random value x, the electronic identity card 109 may produce a sector-specific pseudonym u that identifies the individual to sector s, this may, for example, be computed as:

$$u = \text{hash}(y^x)$$

Thus, a particular electronic identity card 109 includes a card-specific random value x 217 and instructions to compute the pseudonym u given the sector-public key y, instructions 218. A property of the Restricted Identification mechanism is unlinkability across domains, i.e., that a service provider of one sector may recognize pseudonyms of individual cards while it is impossible for service providers of other sectors to link interactions of one user over multiple sectors. Restricted Identification is described in Bender et al. *Domain-Specific Pseudonymous Signatures for the German Identity Card*, https://eprint.iacr.org/2012/558.pdf, accessed on Jul. 27, 2015. While the technology described herein may make use of the Restricted Identification process of the eIDAS token and as described in, for example, TR-03110 (BSI TR-03110 Technical Guideline Advanced Security Mechanisms for Machine Readable Travel Documents and eIDAS Token, https://www.bsi.bund.de/EN/Publications/TechnicalGuidelines/TR03110/BSITR03110.html, accessed on, Jul. 27, 2015), any protocol that provides for pseudonyms that are unlinkable across domains may be used to implement the mechanisms described herein.

The memory 305 may also store a number of attributes 221. Attributes 221 may be data structures that prove to an inquirer that the holder of the electronic identity card 109 satisfies some particular quality, e.g., citizenship, without revealing the identity of the holder of the electronic identity card 109. Thus, if a voter 101 must establish that he or she is a citizen of a jurisdiction holding an election, the administration of the election may request the citizenship attribute 223 be provided by the electronic identity card 109. Other attributes useful in a public election context include age 225 and municipality 227, and person's criminal record 229 may disqualify a potential voter. In special elections such as elections run by organization, e.g., a union, membership 231 to the organization may be relevant. Alternatively, an attribute may simply be a credential signifying that the voter 101 is eligible to vote in a given election.

An attribute is a data structure provided by an attribute provider that makes an assertion about some characteristic, e.g., as here, the eligibility to vote. The attribute provider is an external entity that has some knowledge about the characteristic being asserted by the attribute, i.e., a government entity that keeps citizenship records. The attribute assertion is provided as a message, the attribute message, which is digitally signed by the attribute provider using the attribute provider's private key. Thus, a verifier may verify that the assertion made via the attribute is correct by verifying the signature provided as being that of the attribute provider. Herein, attribute, unless the context is clear to the contrary, refers to such a digital attribute provided by an attribute provider. There may also be an assertion made by the voter 101 by having the electronic identity card 109 sign the attribute message.

The mathematics of attributes is outside of the scope of this paper. However, attributes are described in [TR 03110], supra, which is incorporated herein by reference. Attributes may be signed by an attribute authority. Thus, when an electronic identity card 109 provides an attribute, e.g., citizenship 223, that attribute is a signed data item that (1) asserts the citizenship and that (2) may be verified as having been provided by a trusted attribute provider.

Turning now to use of the restricted identification technology to provide for a secure and flexible mechanism for electronic voting according to several embodiments.

Figure 5A:
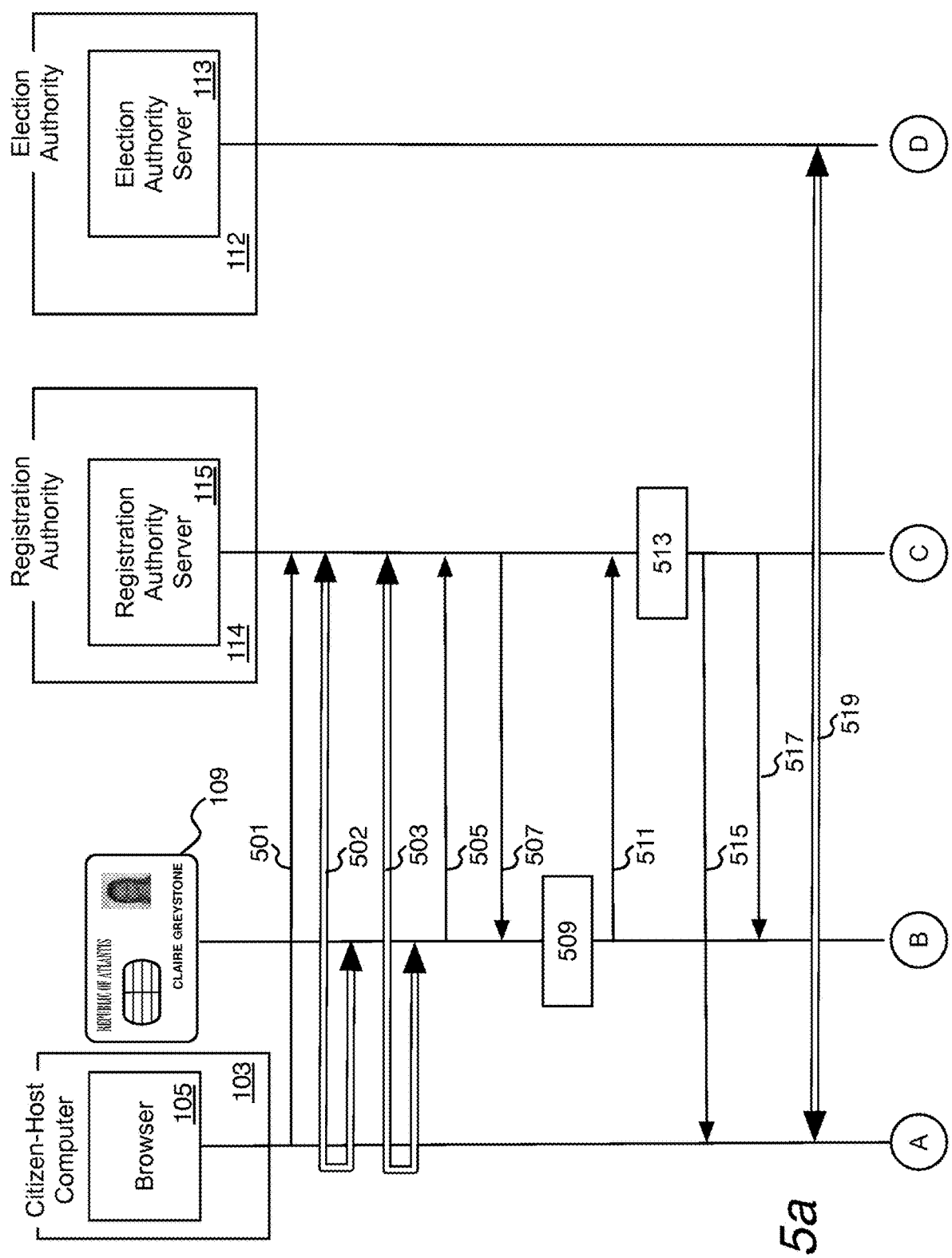
FIG. 5 (split into FIGS. 5a and 5b) is a timing-sequence diagram that illustrates a first embodiment in which a pseudonym mechanism that provides for unlinkability across domains, e.g., Restricted Identification, is used in the context of an electronic election.
Figure 5B:
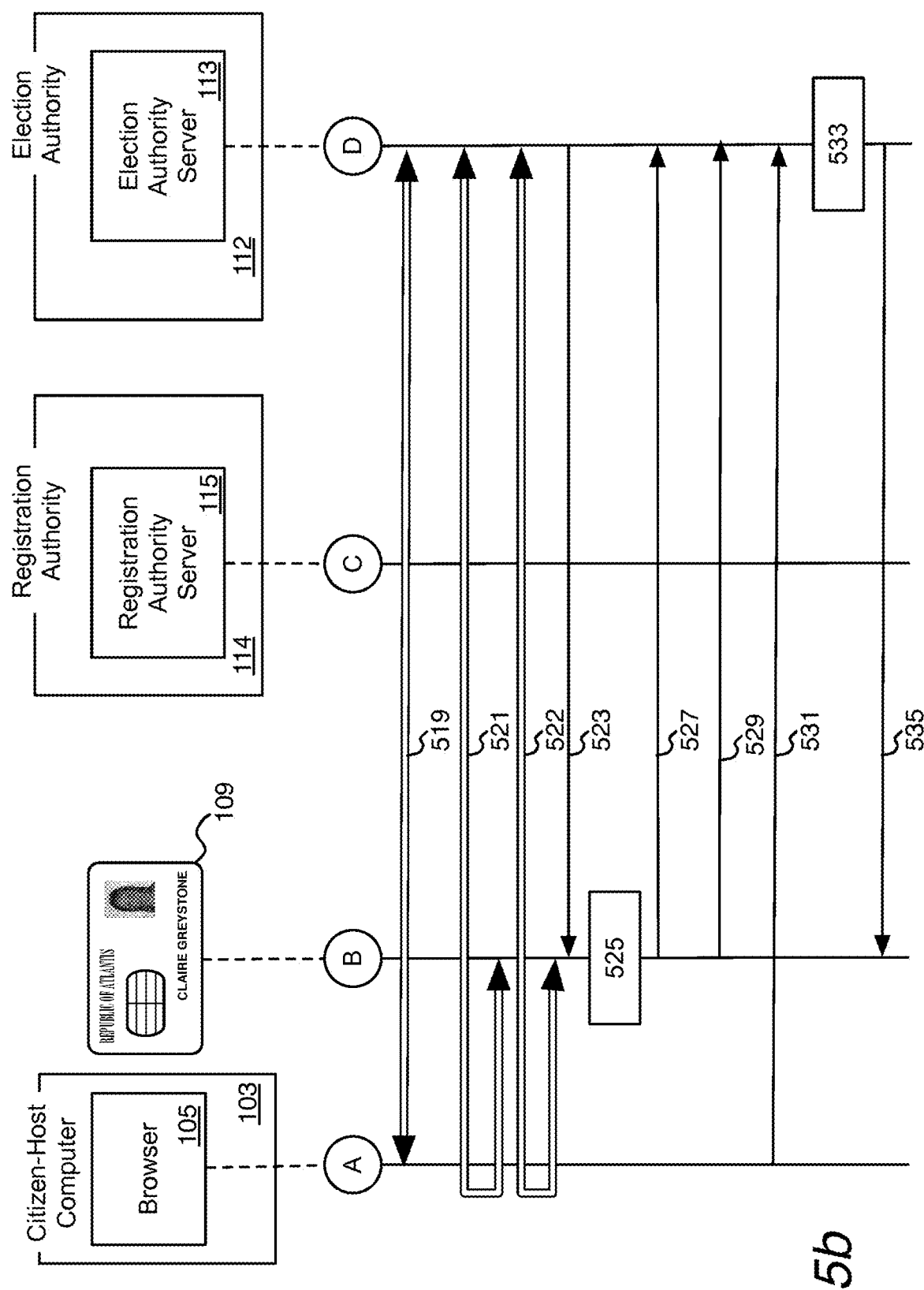

FIG. 5 is a timing-sequence diagram that illustrates a first embodiment in which a pseudonym mechanism that provides for unlinkability across domains, e.g., Restricted Identification, is used in the context of an electronic election.

There are two mechanisms to use an electronic identity card 109, e.g., an eIDAS token, to obtain a cross-domain unlinkable pseudonym:

GAP Flow 1: PACE+TA v2+CA v2+RI
GAP Flow 2: PACE+TA v2+CA v3

Password Authenticated Connection Establishment (PACE) is described in Internet Engineering Task Force (IETF), Password Authenticated Connection Establishment with the Internet Key Exchange Protocol version 2 (IKEv2), https://tools.ietf.org/html/rfc6631; Terminal Authentication (TA), Chip Authentication CA v2 and CA v3, and Restricted Identification (RI) are described in [TR03110], supra.

In other words, according to established eIDAS standard protocols such as GAP, PACE, TA, CA, and RI, there are at least two different mechanisms for obtaining a cross-domain unlinkable pseudonym. Yet other mechanisms may be used. Hereinafter, we use the term cross-domain unlinkable pseudonym to generically refer to any mechanism for obtaining a pseudonym for a chip, or other electronic device, that is a chip (or machine) specific pseudonym for a particular terminal sector. A terminal sector is an identifier shared by all terminals of a given service provider, e.g., a registration authority or an election authority. Further to qualify as a cross-domain unlinkable pseudonym, the pseudonym cannot be linked across terminal-sectors.

A voter 101, not shown, operates a citizen host computer 103 running a browser 105.

Step 501: The process commences with the voter 101 establishing a web-session to the registration authority 114, specifically, to a server 115 operated by the registration authority.

Step 502: Ancillary to the establishment of a web-session between the voter 101 and the registration authority server 115, a general authentication procedure (GAP) (or similar mutual authentication) is performed between the registration authority server 115 and the electronic identity card 109. GAP (see, [TR 03110], supra) comprises three protocols:

Password Authenticated Connection Establishment—PACE
  provides protection against eavesdropping and anti-skimming, usually on contactless cards
  Prior to PACE execution, almost no operation is allowed involving the electronic identity card 109, for privacy reasons Generates a Secure Messaging based on a user password, which can be one of MRZ (Machine Readable Zone, usually extracted by an optical reader, used on e-Passport border control), CAN: Card Access Number, a number usually printed on the electronic identity card 109, PIN (Personal Identification Number)

PACE is executed locally between the voter 101 and the voter's device, here the electronic identity card 109 (browser/Sconnect or smartphone or card reader)

Once PACE is established, subsequent authentication protocols are executed under PACE Secure Messaging (PACE SM)

Terminal Authentication—TA

Authenticates the Terminal to chip 205 of the electronic identity card 109 (herein, the "terminal" is, for example, the registration authority server 115 or the Identity Provider (IDP) that the registration authority server 115 relies on). The electronic identity card 109 (specifically, the chip 205) knows it can trust the terminal and the authorizations the terminal has Executed under PACE SM Chip Authentication—CA Authenticates the chip 205 of the electronic identity card 109 to the registration authority server 115. The registration authority server 115 knows the chip 205 of the electronic identity card 109 is genuine Executed under PACE SM At the end of CA, a new Secure Messaging is established, replacing the PACE Secure Messaging Thus, GAP operates as a mutual authentication of the electronic identity card 109 and the registration authority server 115. After the GAP, a secure communications channel has been established between the electronic identity card 109 and the registration authority server 115. Further, the GAP establishes trust between the electronic identity card 109 and the registration authority server 115 such that assertions made by the electronic identity card 109, e.g., attributes and pseudonyms obtained from the electronic identity card 109, are trusted to be correct and authentic. A property of GAP is that the voter 101 may remain anonymous and untraceable with respect to the registration authority server 115.

Step 503: The web-browser 105 is extended using Gemalto's SConnect technology which allows a remote server to establish a secure connection to an electronic token connected to the host computer on which the web-browser is executing. Using the SConnect browser extension, an SConnect session is established between the registration authority server 115 and the electronic identity card 109.

Step 505: Using the SConnect connection, the registration authority server 115 optionally retrieves one or more attributes 221 stored on the electronic identity card 109, e.g., the citizenship 223 and the age 225 of the voter 101. Voter eligibility may be determined based on such attributes. Alternatively, voter eligibility is based on a cross-domain unlinkable pseudonym, as described below.

Steps 507-511: Produce a cross-domain unlinkable pseudonym, e.g., eIDAS Restricted Identity, for the electronic identity card 109 corresponding to the registration authority 114 sector. The flow in steps 507-511 are provided here as an example and correspond to the Restricted Identity flow for obtaining a pseudonym for the electronic identity card 109 for the registration authority sector. As noted herein above, a cross-domain unlinkable pseudonym may be obtained in several different ways, for example, the eIDAS Restricted Identity protocol or by using Chip Authentication v3.

Step 507: The registration authority server 115 transmits a sector public key $y_{ra}$ of the registration authority 114 to the electronic identity card 109.

Step 509: The electronic identity card 109 uses the sector public key $y_{ra}$ to compute a pseudonym $U_{ra}$ corresponding to the voter 101 and being relevant to the sector for the registration authority 114. The sector public key $y_{ra}$ is specific to one particular registration authority. Multiple registration authorities 114 may register voters for a particular election. Each of these registration authorities 114 has its own public key $y_{ra}$. By not sharing public keys $y_{ra}$ over different registration authorities 114, the pseudonym used with each registration authority 114 is unique and, therefore, not linkable.

Step 511: The electronic identity card 109 transmits the pseudonym $U_{ra}$ to the registration authority server 115.

Step 513: Having received the required attributes or the pseudonym $U_{ra}$ for the voter 101, the registration authority server 115 verifies the eligibility of the voter 101 to participate in the election. Furthermore, in an alternative embodiment, the registration authority server 115 may maintain blacklists of voters that are banned from participating in certain elections or may use whitelists to maintain a record of confirmed eligibility. The registration authority server 115 may also record the pseudonym $U_{ra}$ to prevent repeat voting.

Step 515: The point of the registration authority 114 is to confirm eligibility and reject potential voters who are not eligible to cast votes. Thus, the registration authority server 115 may transmit an message of some kind to the browser 105 to alert the voter 101 that he or she is eligible and that his or her registration to vote has been registered or vice versa.

If the voter 101 is not eligible no further action is taken and the process flow would terminate at step 515.

Figure 6:
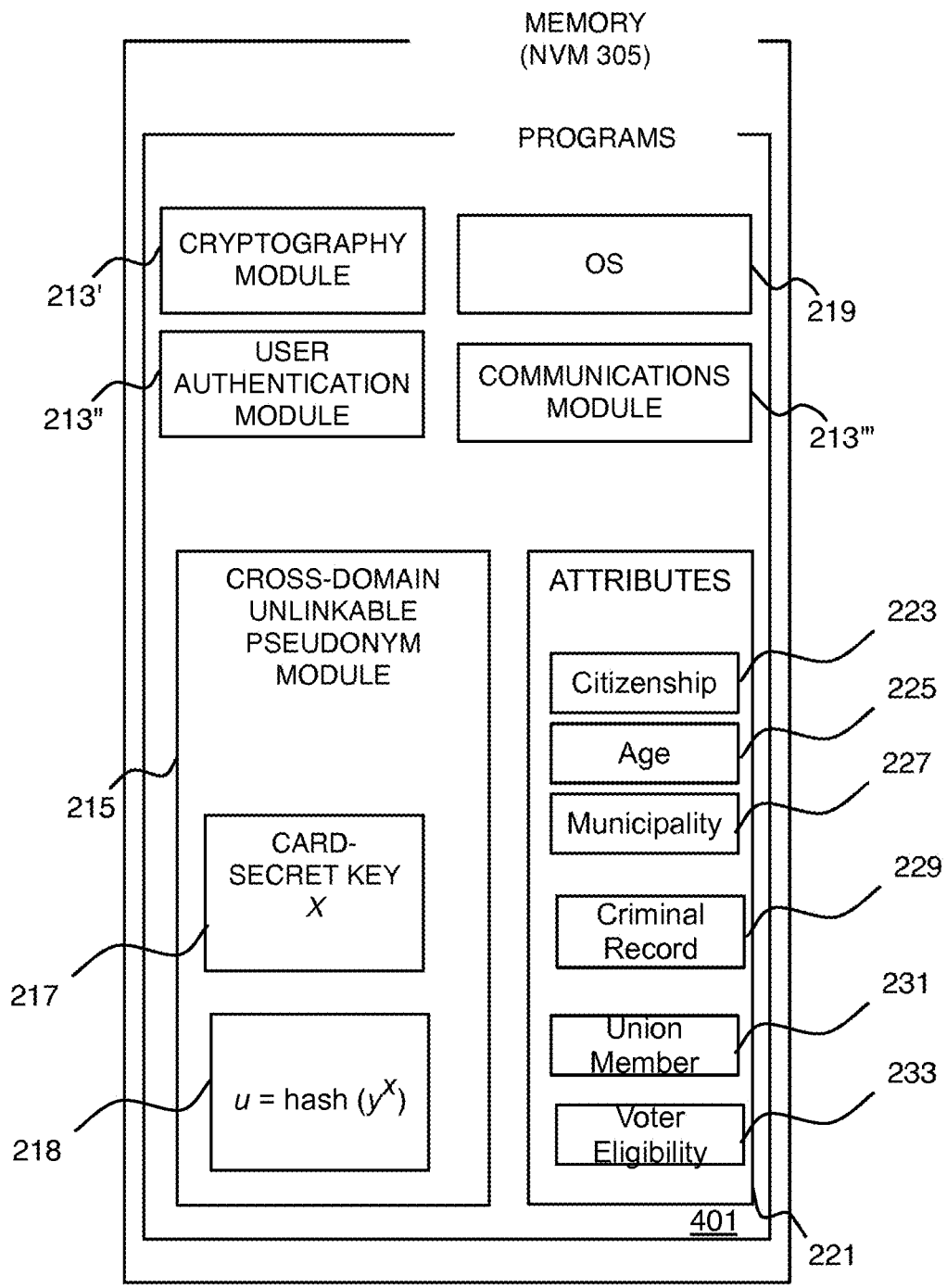
FIG. 6 is a block diagram illustrating the memory of the electronic identity card with the addition of a voter eligibility attribute stored in the memory of the electronic identity card during the process of FIG. 5.

Step 517: On the other hand, if the voter 101 is eligible, based on attributes or analysis of black or white lists, a voter eligibility attribute 233 is stored on the electronic identity card 109 by the registration authority server 115. The voter eligibility attribute 233 may be stored on the electronic identity card 109 using the Enhanced Role Authentication protocol defined for eIDAS tokens. German, Bundesamt für Sicherheit in der Informationstechnik, Technical Guideline TR-03110-3, Advanced Security Mechanisms for Machine Readable Travel Documents and eIDAS Token. The registration authority server 115 may cryptographically sign the voter registration attribute 233 using the private key of the registration authority 114. FIG. 6 is a block diagram illustrating the memory 305 of the electronic identity card 109 with the addition of a voter eligibility attribute 233.

Step 519: With the voter eligibility attribute 233 on the electronic identity card 109, the voter 101 starts a web-session 519 with the election authority 112, specifically with the election authority server 113, in which the voter 101 casts a vote.

Step 521: Using the SConnect browser extension, an SConnect session is established between the election authority server 113 and the electronic identity card 109.

Step 522: The election authority server 113 and the electronic identity card 109 engage in a GAP procedure to establish a secure communications channel between the electronic identity card 109 and the election authority server 113. Further, the GAP establishes trust between the electronic identity card 109 and the election authority server 113 such that assertions made by the electronic identity card 109, e.g., attributes and pseudonyms obtained from the electronic identity card 109, are trusted to be correct and authentic.

Steps 523-527: Produce a cross-domain unlinkable pseudonym $U_{ea}$, e.g., eIDAS Restricted Identity, for the electronic identity card 109 corresponding to the election authority 112 sector. The flow in steps 523-527 are provided here as an example and correspond to the Restricted Identity flow for obtaining a pseudonym for the electronic identity card 109 for the election authority sector. As noted herein above, a cross-domain unlinkable pseudonym may be obtained in several different ways, for example, the eIDAS Restricted Identity protocol or by using Chip Authentication v3.

Step 523: The election authority server 113 transmits request for a pseudonym $U_{ea}$ of the voter 101 with the sector public key $y_e$ of the election authority 112 to the electronic identity card 109.

Step 525: The electronic identity card 109 uses the sector public key $y_e$ to compute a pseudonym $U_{ea}$ corresponding to the voter 101 and being relevant to the sector for the election authority 112.

Step 527: The electronic identity card 109 transmits the pseudonym $U_{ea}$ to the election authority server 113.

Step 529: The election authority server 113 retrieves the voter eligibility attribute 233 from the electronic identity card 109.

Step 531: The voter casts a vote, for example, using a web form provided by the election authority server 113 to the web-browser 105. The provisioning of such a ballot form would be predicated on the retrieval of a valid voter eligibility attribute 233 from the electronic identity card 109 and a determination from the pseudonym $U_{ea}$ that the voter has not previously voted in the election. As in the Estonian E-Voting system (described hereinabove), there is no restriction on how many times a voter 101 may change the vote cast. However, only the last vote cast before the close of the election is counted.

The security of the step of casting a vote may be strengthened by having the vote signed using a pseudonymous signature, e.g., as described in [TR03110] and [Bender] Jens Bender et al., Domain-Specific Pseudonymous Signatures for the German Identity Card, https://eprint.iacr.org/2012/558.pdf, accessed on, Jul. 27, 2015, or by pseudonymous signature of the attribute that states that the voter is eligible to vote.

Step 533: In one embodiment, the casting of a vote by the voter 101 is recorded by being indexed on the pseudonym $U_{ea}$ of the voter 101. Thus, the pseudonym $U_{ea}$ may be used to ensure that only one vote of a voter 101 is counted. Alternatively, the casting of a vote may be recorded using an attribute supplied by the electronic identity card 109 to the election authority server 113.

Figure 7:
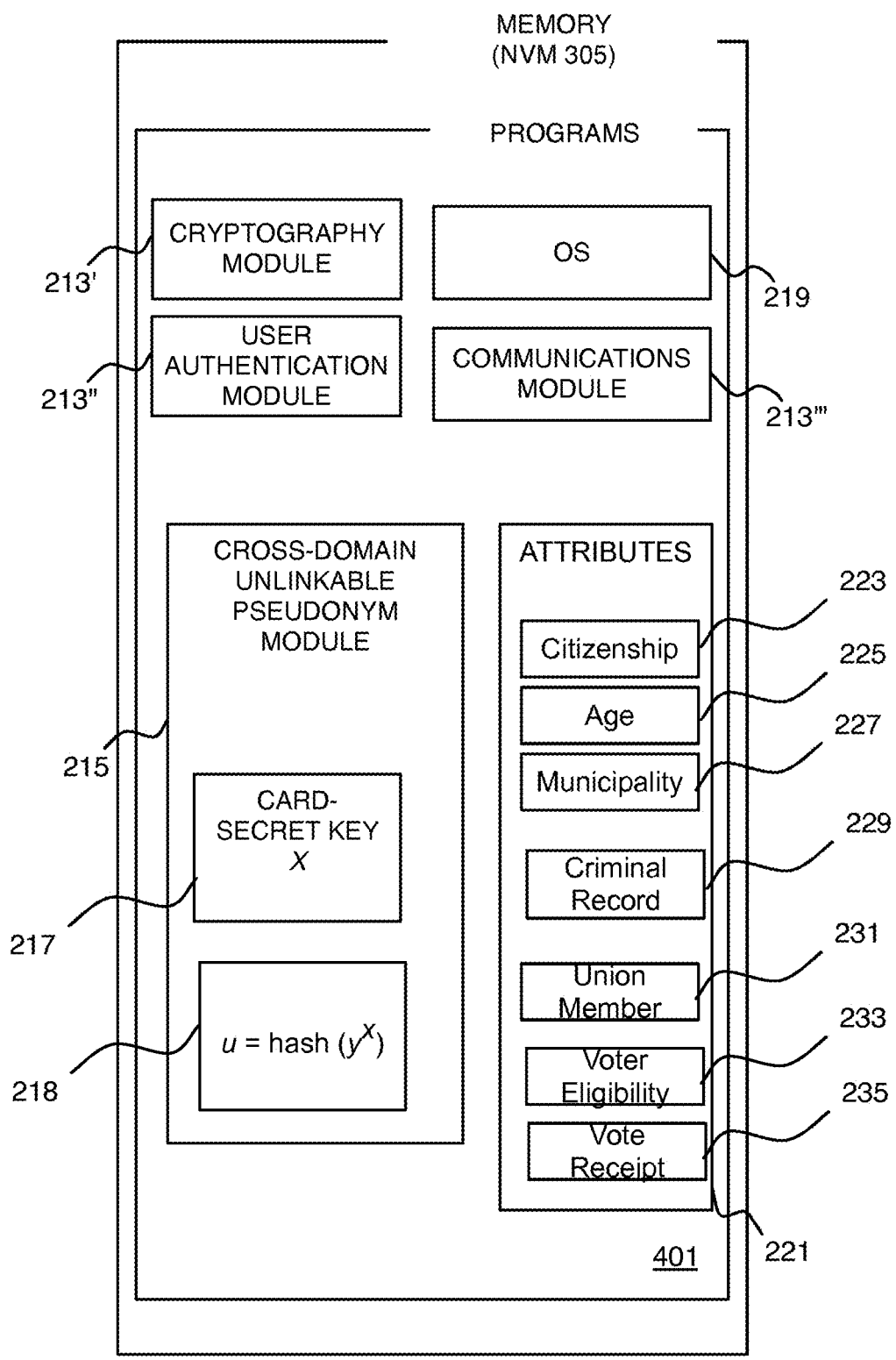
FIG. 7 illustrates the recordation of the voting receipt attribute in the electronic identity card.

Step 535: A receipt attribute 235 is written to the electronic identity card 109 by the election authority server 113. The receipt attribute contains information that allows both the citizen to prove that they have voted and to check against published election results that their vote has been recorded (e.g., on an election bulletin board). However, the receipt does not contain any information on how the voter 101 voted thus preventing coercion. FIG. 7 illustrates the recordation of the voting receipt attribute 235 in the electronic identity card 109. This voting receipt attribute 235 may also be written using the Enhanced Role Authentication defined for eIDAS tokens. The voting receipt attribute 235 is advantageously signed by the election authority server 113 using the public key of the election authority 112.

In specific implementations there are mechanisms for how the receipt attribute 235 is used to verify that a voter has voted and that the vote has been counted. For example, in one embodiment the receipt attribute is recorded on a bulletin board where the receipt attribute 235 supplied to the voter may be cross-checked by the voter or an election judge.

Figure 8:
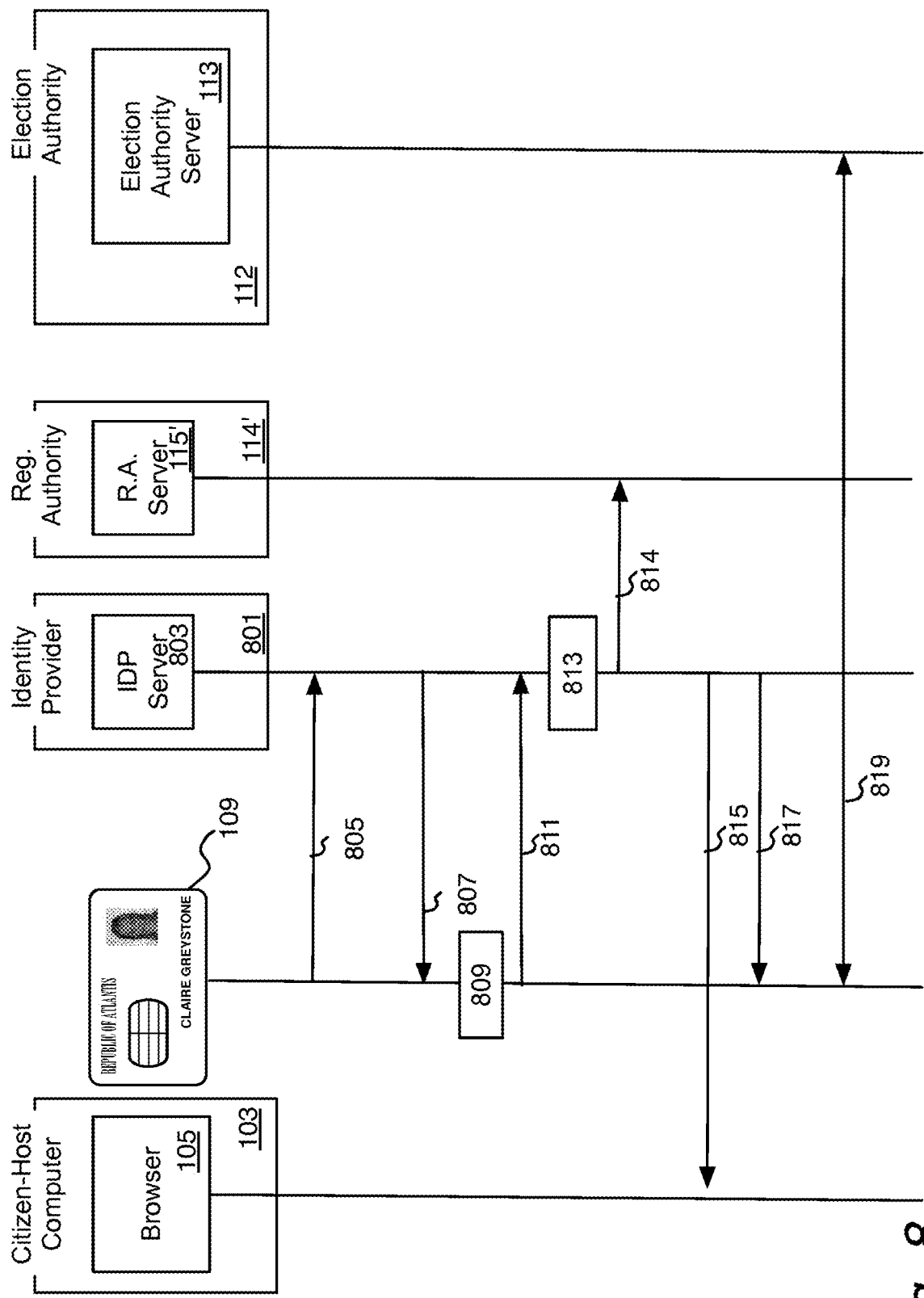
FIG. 8 is a timing sequence diagram illustrating a second embodiment in which the role of the registration authority of FIG. 5 is split into two portions, an identity provider and a registration authority.

There are many possible embodiments on the mechanism for providing for remote electronic voting described herein above. FIG. 8 is a timing sequence diagram illustrating a second embodiment in which the role of the registration authority 114 of FIG. 5 is split into two portions, an identity provider 801 operating an identity provider server 803 and a registration authority 114' operating a registration authority server 115'. The interaction with the election authority 112, specifically, election authority server 113, is as in the embodiment of FIG. 5, the discussion of which is incorporated here by reference. As in the embodiment described in conjunction with FIG. 5, mutual authentication and secure communications channels between the electronic identity card 109 and the servers 115', 113, and 803 are established using, for example, GAP and SConnect. These steps are not illustrated in FIG. 8.

Step 805: Using the SConnect connection, the identity provider server 803 retrieves one or more attributes 221 stored on the electronic identity card 109, e.g., the citizenship 223 and the age 225 of the voter 101.

Steps 807-811: Produce a cross-domain unlinkable pseudonym $U_{ra}$, e.g., eIDAS Restricted Identity, for the electronic identity card 109 corresponding to the registration authority 114 sector. The flow in steps 807-811 are provided here as an example and correspond to the Restricted Identity flow for obtaining a pseudonym for the electronic identity card 109 for the registration authority sector. As noted herein above, a cross-domain unlinkable pseudonym may be obtained in several different ways, for example, the eIDAS Restricted Identity protocol or by using Chip Authentication v3.

Step 807: The identity provider server 803 transmits a sector public key $y_{ra}$ of the identity provider 801 to the electronic identity card 109.

Step 809: The electronic identity card 109 uses the sector public key $y_{ra}$ to compute a pseudonym $U_{ra}$ corresponding to the voter 101 and being relevant to the sector for the registration authority 114. The sector public key $y_{ra}$ is specific to one particular registration authority. Multiple identity providers 801 may provide voter identification for a particular election. Each of these identity providers 801 has its own public key $y_{ra}$. By not sharing public keys $y_{ra}$ over different identity providers 801, the pseudonym used with each identity provider is unique and, therefore, not linkable.

Step 811: The electronic identity card 109 transmits the pseudonym $U_{ra}$ to the identity provider server 803.

Step 813: Having received the required attributes or the pseudonym $U_{ra}$ for the voter 101, the identity provider server 803 verifies the eligibility of the voter 101 to participate in the election. Furthermore, in an alternative embodiment, the identity provider server 803 may maintain blacklists of voters that are banned from participating in certain elections or may use whitelists to maintain a record of confirmed eligibility. The identity provider server 803 may also record the pseudonym $U_{ra}$ to prevent repeat voting.

Step 814: The identity provider server 803 transfers proof of voter eligibility to the registration authority server 115' using a secure protocol such as SAML. SAML (Security Assertion Markup Language) is a data format by which an identity provider may provide authentication, entitlement, and attribute information to a service provider. SAML allows an entity, here the identity provider 802 to make an assertion in regard to identity, attributes, and entitlements of a subject, here the voter 101. Thus, SAML may be used by the identity provider server 803 to assert to the registration authority server 115' that the voter 101 is eligible to vote.

Step 815: The point of the identity provider 801 is to confirm eligibility and reject potential voters who are not eligible to cast votes. Thus, the identity provider server 803 may transmit an message of some kind to the browser 105 to alert the voter 101 that he or she is eligible and that his or her registration to vote has been registered or vice versa.

If the voter 101 is not eligible no further action is taken and the process flow would terminate at step 815.

Step 817: On the other hand, if the voter 101 is eligible, based on attributes or analysis of black or white lists, a voter eligibility attribute 233 is stored on the electronic identity card 109 by the registration authority server 115'. The voter eligibility attribute 233 may be stored on the electronic identity card 109 using the Enhanced Role Authentication protocol defined for eIDAS tokens. The registration authority server 115' may cryptographically sign the voter registration attribute 233 using the private key of the registration authority 114. FIG. 6 is a block diagram illustrating the memory 305 of the electronic identity card 109 with the addition of a voter eligibility attribute 233.

The vote casting portion proceeds as in the embodiment of FIG. 5, step 819, corresponding to Steps 519-533, notably using a second distinct cross-domain unlinkable pseudonym $U_{ea}$ to identify the voter 101 with the election authority server 113.

Figure 9:
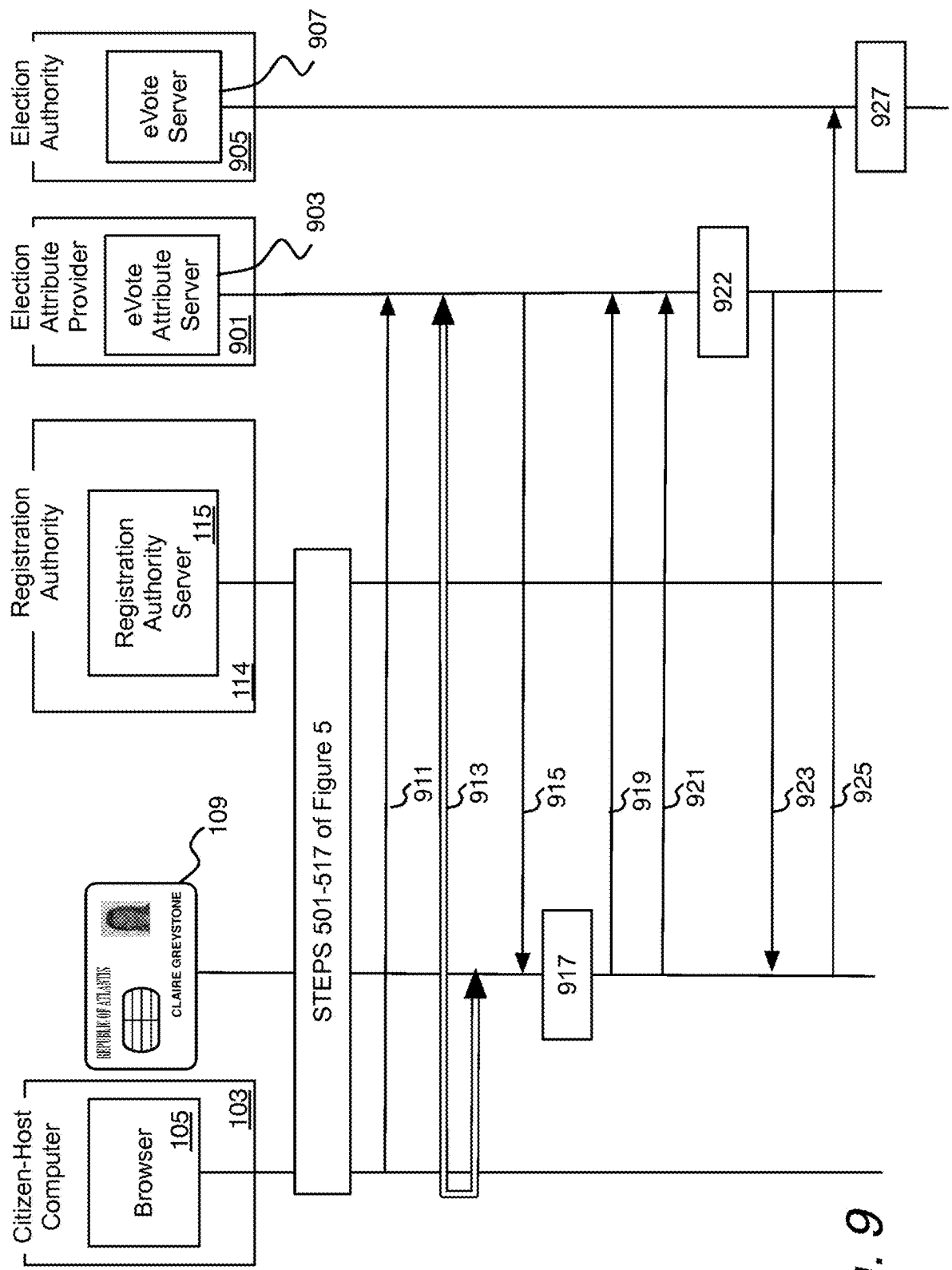
FIG. 9 is a timing-sequence diagram illustrating a third embodiment in which the election authority role of FIG. 5 is split into two portions: an election attribute provider and an election authority.

FIG. 9 is a timing-sequence diagram illustrating a third embodiment in which the election authority role of FIG. 5 is split into two portions: an election attribute provider 901 operating an electronic voting attribute server 903 and an election authority 905 operating an election authority server 907. In contrast to the embodiment illustrated in FIG. 8, for the embodiment of FIG. 9, the initial interaction with the registration authority (steps 501-517) are as in FIG. 5, incorporated here by reference, notably, using a first cross-domain unlinkable pseudonym $U_{ra}$ to identify the voter 101 to the registration authority 114.

As in FIG. 5, having registered with the registration authority server 115, the voter eligibility attribute 233 is added to the memory 305 of the electronic identity card 109.

Step 911: The voter creates a web session with the election attribute provider 901, specifically the election attribute provider server 903, from the browser 105.

Step 913: Using GAP and Sconnect, for example, a secure connection is established between the electronic identity card 109 and the election attribute provider server 903. This step 913 corresponds to steps 521 and 522 in FIG. 5b with the modification that the connection is to the election attribute provider server 903 rather than the election authority server 113.

Step 915: The election attribute provider server 903 transmits request for a pseudonym $U_{ea}$ of the voter 101 with the sector public key $y_{eap}$ of the election attribute provider 901 to the electronic identity card 109.

Step 917: The electronic identity card 109 uses the sector public key $y_{eap}$ to compute a second cross-domain unlinkable pseudonym $U_{ea}$ corresponding to the voter 101 and being relevant to the sector for the election authority 112.

Step 919: The electronic identity card 109 transmits the cross-domain unlinkable pseudonym $U_{ea}$ to the election authority server 113.

Step 921: The election attribute provider server 903 retrieves the voter eligibility attribute 233 from the electronic identity card 109.

Step 923: The voter casts a vote, for example, using a web form provided by the election attribute provider server 903 to the web-browser 105. The provisioning of such a ballot form would be predicated on the retrieval of a valid voter eligibility attribute 233 from the electronic identity card 109 and a determination from the cross-domain unlinkable pseudonym $U_{ea}$ that the voter has not previously voted in the election. As in the Estonian E-Voting system (described hereinabove), there is no restriction on how many times a voter 101 may change the vote cast. However, only the last vote cast before the close of the election is counted.

As with the embodiment of FIG. 5, security of vote casting may be further enhanced by providing and checking a pseudonymous signature.

Step 922: The election attribute provider server 903 encrypts the vote, for example using a shared secret known by the election attribute provider server 903 and the eVote server 907.

Step 923: The election attribute provider server 903 stores the numerically encoded vote on the electronic identity card 109. The mathematical function determining the encoding of the vote depends on selected voting scheme. It may be stored as an attribute, which may be signed by an attribute authority or the election attribute provider server 903 acts as an attribute authority by which the validity of the attribute may be determined. The act of casting the vote with the election attribute provider server 903 and having the election attribute provider server 903 store a numerical encoding thereof on the electronic identity card 109 may be viewed as analogous to the preparation of a paper voting slip in conventional elections. The election attribute provider server 903 may also store a receipt on the electronic identity card 109 as an attribute. The receipt contains information that allows the voter 101 to both prove having voted and to check against published election results that the voter's vote was recorded, for example, on an election bulletin board.

Step 925: The voter 101 goes to the election, i.e., an election precinct operated by the election authority 905. The election authority 905 operates an eVote server 907. There, the voter 101 delivers the cast numerically encoded vote together with the voter's pseudonym for the election $U_{ea}$. Optionally, the vote may be signed by the card using a pseudonymous signature.

Step 927: The eVote server 907 stores the vote so that it may be tallied and, for example, on an election bulletin board such that the voter 101 may verify that the voter's vote has been recorded.

The mechanism for casting votes of FIG. 9 allows voters to change their signature up the delivery of the vote to the eVote server 907.

Figure 10:
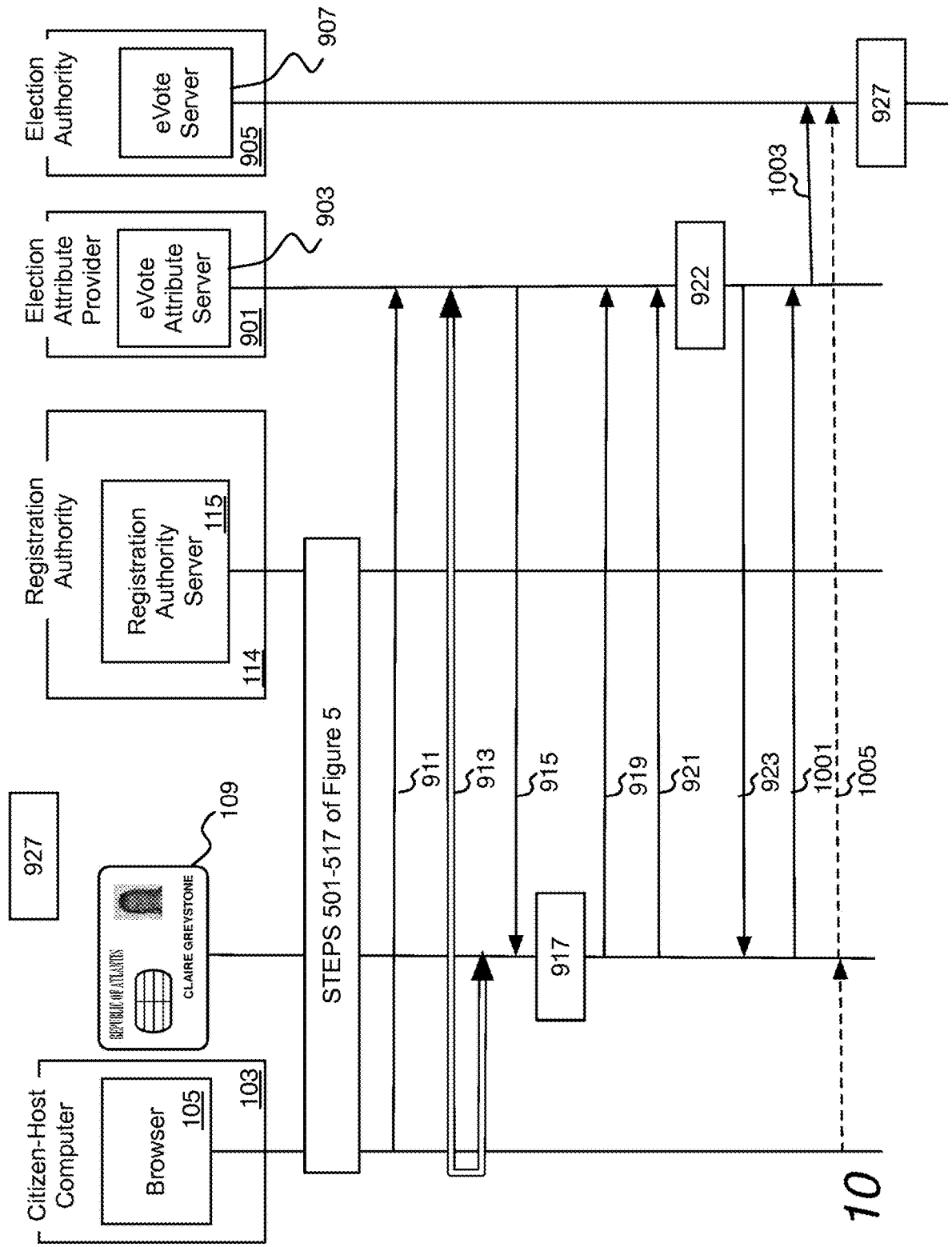
FIG. 10 is a timing sequence diagram of a close alternative to the embodiment illustrated in FIG. 9 in which the vote is transferred from the election attribute provider server directly to the eVote server.

FIG. 10 is a timing sequence diagram of a close alternative to the embodiment illustrated in FIG. 9. In the embodiment of FIG. 10, rather than the voter 101 delivering the vote to the election, the vote is transferred from the election attribute provider server 903 directly to the eVote server 907 or by email (or similar transfer) to the eVote server 907.

Steps 501-517 as well as Steps 911-923 and 927 are the same as in the embodiment of FIG. 9.

Step 1001: the electronic identity card 109 computes a pseudonymous transferable proof, e.g., the vote pseudonymously signed, and delivers that proof to the election attribute provider server 903.

Step 1003: The election attribute provider server 903 delivers the vote, in the form of the pseudonymously signed vote, to the eVote server 907.

Step 1003': In an alternative embodiment, in lieu of the election attribute provider server 903 delivering the vote, the voter 101 sends the vote, by directing the electronic identity card 109 to send the vote, in the form of the pseudonymously signed vote, to the eVote server 907, for example, by emailing the vote to the election attribute provider server 903. Naturally, this can be accomplished in several ways, for example, by the voter 101 retrieving the pseudonymously signed vote from the electronic identity card 109 and emailing to the eVote server 907 or by having the electronic identity card 109 email it directly to the eVote server 907.

From the foregoing it will be apparent that a technology is described herein for providing remote electronic voting that provides for secure registration for elections in an election scheme agnostic fashion, that requires no election specific materials be provided to the voter during the registration phase, and which does not require the voter to physically visit a registration authority. The election scheme makes use of pseudonyms that are unlinkable across domains, e.g., by providing for one cross-domain unlinkable pseudonym for registration with a registration authority and another cross-domain unlinkable pseudonym for use with the election itself.

Although specific embodiments of the invention have been described and illustrated, the invention is not to be limited to the specific forms or arrangements of parts so described and illustrated. The invention is limited only by the claims.

The invention claimed is:

1. A method for electronic voting in an electronic voting system including a registration authority server operated by a registration authority, an election authority server operated by an election authority, and a voter-host computer connected to an electronic identity card associated with a holder of the electronic identity card casting a vote, comprising:
   establishing a first web session between the voter-host computer and the registration authority;
   using the first web session between the voter-host computer and the registration authority to establish a first secure connection between the registration authority and the electronic identity card using a browser extension;
   over the first secure connection between the registration authority and the electronic identity card, retrieve by the registration authority an eligibility basis from the electronic identity card;
   determine voter eligibility, by the registration authority, based on the retrieved eligibility basis;
   operating the registration authority server to write a vote-eligibility attribute on the electronic identity card over the first secure connection;
   establish a second web session between the voter-host computer and the election authority;
   using the second web session between the voter-host computer and the election authority to establish a second secure connection between the registration authority and the electronic identity card; and
   operating the election authority server to retrieve the vote-eligibility attribute from the electronic identity card over the second secure connection between the election authority and the electronic identity card and, upon receiving a vote from the voter using a web-browser connected to the election authority, writing an attribute on the electronic identity card indicative of receipt of a vote cast by the voter using the second secure connection between the voter-host computer and the election authority.

2. The method of claim 1 further comprising:
   operating the registration authority server and the electronic identity card to establish a first pseudonym for the electronic identity card, the first pseudonym being unique to the electronic identity card and the registration authority;
   wherein the eligibility basis is the first pseudonym; and
   determining, by the registration authority, voter eligibility by comparing the first pseudonym against a blacklist of pseudonyms of individuals not allowed to vote or a white list of individuals allowed to vote.

3. The method for electronic voting of claim 1 wherein the eligibility basis is an eligibility-basis attribute enabling the registration authority to determine whether the holder of the electronic identity card is eligible to vote in the election.

4. The method of claim 2 further comprising operating the registration authority to direct the electronic identity card to calculate the first pseudonym and operating the registration authority to retrieve the first pseudonym from the electronic identity card.

5. The method of claim 2 wherein the registration authority further comprises an identity provider and wherein the step of providing the first pseudonym comprises providing the first pseudonym, by the electronic identity card, to the identity provider.

6. The method of claim 1 wherein the attribute indicative of receipt of a vote cast by the voter provides a mechanism by which the holder of the electronic identity card verifies that the vote of the holder of the electronic identity card has voted in the election.

7. The method of claim 1 wherein the election authority server further comprises an election attribute provider server, wherein the election attribute provider server:
   receives the vote-eligibility attribute;
   receives the vote from the voter; and
   stores the attribute indicative of receipt of the vote cast by the voter on the electronic identity card.

8. The method of claim 7 wherein the electronic identity card transmits the vote-eligibility attribute and the second pseudonym to an eVote server and wherein the eVote server verifies the eligibility of the voter to vote using the vote-eligibility attribute and records a numerically encoded vote on the electronic identity card; and wherein the electronic identity card forwards the vote-eligibility attribute and the second pseudonym to the eVote server.

9. The method of claim 2, wherein the step of operating the registration authority server and the electronic identity card to establish a first pseudonym for the electronic identity card comprises:
   transmitting, from the registration authority to the electronic identity card, a sector public key for the registration authority;
   computing, by the electronic identity card, the first pseudonym using the sector public key of the registration authority; and
   transmitting, from the electronic identity card to the registration authority, the first pseudonym.

10. The method of claim 2, further comprising:
   operating the election authority server and the electronic identity card to establish a second pseudonym for the electronic identity card, the second pseudonym being unique to the identity card and the election authority, by:
      transmitting, from the election authority to the electronic identity card, a sector public key for the election authority;

computing, by the electronic identity card, the second pseudonym using the sector public key of the election authority; and transmitting, from the electronic identity card to the election authority, the second pseudonym;

wherein the first pseudonym and the second pseudonym are cross-domain unlinkable with respect to one another.

11. The method of claim 3, wherein the eligibility-basis attribute is selected from attributes including citizenship, age, membership in an organization, municipality of voter, and criminal record.

* * * * *